(12) United States Patent
Voss et al.

(10) Patent No.: US 12,567,656 B1
(45) Date of Patent: Mar. 3, 2026

(54) METHOD FOR MAKING A MINIATURE ELECTROCHEMICAL CELL HAVING LITHIUM SWAGED ONTO THE INNTER SURFACE OF A CASING

(71) Applicant: Greatbatch Ltd., Clarence, NY (US)

(72) Inventors: Gregory A. Voss, Alden, NY (US); Josh C. Ulrich, East Aurora, NY (US)

(73) Assignee: Greatbatch Ltd., Clarence, NY (US)

( * ) Notice: Subject to any disclaimer, the term of this patent is extended or adjusted under 35 U.S.C. 154(b) by 503 days.

(21) Appl. No.: 18/107,583

(22) Filed: Feb. 9, 2023

Related U.S. Application Data

(60) Provisional application No. 63/309,023, filed on Feb. 11, 2022.

(51) Int. Cl.
| | |
|---|---|
| *H01M 4/75* | (2006.01) |
| *H01M 10/12* | (2006.01) |
| *H01M 50/528* | (2021.01) |

(52) U.S. Cl.
CPC ........... *H01M 50/528* (2021.01); *H01M 4/75* (2013.01); *H01M 10/123* (2013.01)

(58) Field of Classification Search
CPC ...... H01M 50/50; H01M 50/528; H01M 4/75; H01M 10/123
See application file for complete search history.

(56) References Cited

U.S. PATENT DOCUMENTS

| | | | |
|---|---|---|---|
| 4,347,293 | A | 8/1982 | Goebel et al. |
| 4,492,021 | A | 1/1985 | Wright et al. |
| 4,767,683 | A | 8/1988 | Yamada et al. |
| 6,010,801 | A | 1/2000 | Nakamaru et al. |
| 7,611,805 | B2 | 11/2009 | Duggan et al. |
| 9,118,047 | B2 | 8/2015 | Carlson |
| 10,811,729 | B2 | 10/2020 | Tsuji et al. |

(Continued)

FOREIGN PATENT DOCUMENTS

| | | |
|---|---|---|
| CN | 202067860 U | 12/2011 |
| CN | 103474669 A | 12/2013 |

(Continued)

OTHER PUBLICATIONS

Development of cylindrical PEM fuel cells with semi-cylindrical cathode current collectors, Suseendiran et al., Hydrogen Energy Publications LLC, Oct. 14, 2019.

*Primary Examiner* — Kenneth J Douyette
(74) *Attorney, Agent, or Firm* — Michael F. Scalise

(57) ABSTRACT

A miniature electrochemical cell has a total volume that is less than 0.5 cc. The anode is a lithium sheet that is swaged onto an inner surface of a casing tube to form an anode lumen. The cathode comprises $CF_x$ contacting a rod-shaped current collector and the cathode having a cylindrical shape resides in the anode lumen. The rod-shaped cathode current collector has a cylindrically-shaped outer surface extending along a longitudinal axis. At least one helical groove recessed into the outer surface turns around the longitudinal axis at a constant distance while moving parallel to the axis. The helical groove prevents the $CF_x$ from sliding on or delaminating from the rod-shaped current collector. A separator segregates the anode from contacting the cathode, and an electrolyte activates the anode/cathode.

14 Claims, 9 Drawing Sheets

(56) References Cited

U.S. PATENT DOCUMENTS

| 11,862,804 | B2 | 1/2024 | Koshiol et al. |
| 2003/0171784 | A1* | 9/2003 | Dodd ................ H01M 10/0436 |
| | | | 607/36 |
| 2005/0244706 | A1* | 11/2005 | Wu ................... H01M 50/3425 |
| | | | 429/185 |
| 2005/0249998 | A1 | 11/2005 | Minas et al. |
| 2006/0228620 | A1* | 10/2006 | Martinson ........... H01M 50/167 |
| | | | 429/185 |
| 2012/0154982 | A1 | 6/2012 | Ota et al. |
| 2013/0034761 | A1 | 2/2013 | Kaplin |
| 2013/0236756 | A1 | 9/2013 | Wang et al. |
| 2016/0308219 | A1 | 10/2016 | Keates et al. |
| 2017/0263933 | A1 | 9/2017 | Akikusa et al. |
| 2018/0205091 | A1 | 7/2018 | Kim et al. |
| 2020/0006779 | A1 | 1/2020 | Lee et al. |
| 2020/0411878 | A1 | 12/2020 | Huang et al. |
| 2021/0043942 | A1 | 2/2021 | Takenaka et al. |

FOREIGN PATENT DOCUMENTS

| JP | 2008192383 | A | 8/2008 |
| JP | 3148205 | B2 | 1/2009 |
| JP | 2011154788 | A | 8/2011 |
| JP | 2014143155 | A | 8/2014 |
| KR | 20160062883 | A | 6/2016 |
| WO | 2020039453 | A1 | 2/2020 |
| WO | 2021129905 | A1 | 7/2021 |

* cited by examiner

METHOD FOR MAKING A MINIATURE ELECTROCHEMICAL CELL HAVING LITHIUM SWAGED ONTO THE INNTER SURFACE OF A CASING

CROSS-REFERENCE TO RELATED APPLICATION

This application claims priority to U.S. provisional patent application Ser. No. 63/309,023, filed on Feb. 11, 2022.

BACKGROUND OF THE INVENTION

1. Field of the Invention

The present invention generally relates to the conversion of chemical energy to electrical energy. More particularly, the present invention relates to an electrochemical cell having an electrode assembly comprising a lithium sheet pressed into intimate contact with the inner surface of a cylindrically-shaped casing tube and a cathode active material that is contacted to a rod-shaped cathode current collector. Fluorinated carbon ($CF_x$) is a preferred cathode active material. To help prevent the active material from sliding axially along the current collector, the current collector has a pattern of grooves into which the $CF_x$ is received in a press-fit contact. Preferably, the present electrochemical cell is a miniature cell having a total size or volume that is less than 0.5 cc.

2. Prior Art

U.S. Pat. No. 7,611,805 to Frustaci et al., which is assigned to the assignee of the present invention and incorporated herein by reference, relates to a lithium electrochemical cell. The anode comprises two sheets of lithium that are contacted to the opposed major sides of an anode current collector. This anode construction is impractical in a miniature electrochemical cell because the anode current collector takes up space inside the casing that could otherwise be occupied by both the anode and cathode active materials comprising the electrode assembly. Non-active materials detract from the volumetric efficiency of an electrochemical cell, which is particularly important in a miniature-sized cell.

The cathode is of a powder fluorinated carbon ($CF_x$) that is pressed into intimate contact with a rod-shaped current collector having a plurality of flats that are offset with respect to each other. The flats help to prevent the cathode active material from sliding on the rod-shaped current collector. However, while the flats of the prior art cathode current collector are acceptable for the electrochemical cell described in the '805 patent to Frustaci et al., they present features that are too large for incorporation into a miniature electrochemical cell. Specifically, in such a small electrochemical system as a miniature electrochemical cell having a total volume that is less than 0.5 cc., there is not enough $CF_x$ active material to adequately cover the flats. Instead, the flats are prone to poke though the active material and into contact with the separator enveloping the cathode. This means that the flats could cut through the separator during the manufacturing process and during cell discharge. Breaching the structural integrity of the separator could lead to an internal short-circuit condition.

Finally, both the anode and the cathode are provided in their own separator envelopes. Overlapping edges of the respective separator envelopes are sealed and then folded down along a side of the anode and the cathode. In the present miniature electrochemical cell, there is not enough space inside the casing for redundant separators that have their overlapping distal edges folded along a side of the respective electrode. Instead, the cathode alone is provided in a separator envelope that is sealed closed at a distal end, where there is sufficient space inside the casing.

SUMMARY OF THE INVENTION

The present invention relates to an electrochemical cell comprising lithium as an anode active material that is swaged into contact with the inner surface of a casing tube. The thusly formed tube-shaped lithium anode provides an anode lumen into which the cathode is received. The cathode is formed from a solid cathode active material, such as fluorinated carbon ($CF_x$), contacted to a rod-shaped cathode current collector. The preferred $CF_x$ material is formed into a cylindrically shaped body pressed into intimate contact with the rod-shaped cathode current collector. The cathode contained inside a separator envelope is slid into the anode lumen so that anode active material directly faces cathode active material in a 360° manner. An electrolyte is then filled into casing to activate the electrode assembly, and the casing is hermetically closed. That way, the casing tube serves as the negative terminal and the terminal pin of a glass-to-metal seal (GTMS) connected to the rod-shaped current collector serves as the positive electrode for the miniature electrochemical cell.

In order to augment contact of the cathode active material to the cathode current collector and to prevent potential movement of the $CF_x$ axially along the current collector, the rod-shaped member is provided with a helical groove as a three-dimensional narrow channel or depression that turns around the longitudinal axis of the rod-shaped current collector at a constant distance while moving parallel to the axis or a knurled pattern of two crisscrossing helical grooves that turn in opposite clockwise and counterclockwise directions around the longitudinal axis of the rod-shaped member while moving parallel to the axis. The various grooved patterns do not extend outwardly beyond a cylindrically-shaped outer surface of the rod-shaped member. Instead, to augment volumetric efficiency inside the casing, they provide recessed irregularly-shaped surfaces that help the cathode active material maintain intimate physical contact with the current collector. That way, the grooves prevent the cathode active material from sliding in an axial direction along the current collector and from separating and delaminating from the outer surface of current collector.

The terminal pin of the GTMS is axially joined to a distal end of the rod-shaped cathode current collector rod. The terminal pin is preferably of molybdenum, while the rod-shaped cathode current collector is preferably of titanium. Since these materials are difficult to weld together, especially with the terminal pin being of a relatively small diameter, a portion of the terminal pin is received in an axial bore provided in the upper end of the rod-shaped cathode current collector. The other end of the terminal pin is supported in the GTMS and the ferrule of the GTMS seals the upper open end of the casing tube.

The electrode assembly is activated with a nonaqueous electrolyte hermetically sealed inside the casing. This makes the present cell particularly useful for powering implantable medical devices, such as cardiac pacemakers, defibrillators, drug pumps, neurostimulators, and the like.

These and other aspects of the present electrochemical cell will become more apparent to those skilled in the art by reference to the following detailed description and to the appended drawings.

DETAILED DESCRIPTION OF THE PREFERRED EMBODIMENTS

A miniature electrochemical cell is defined as a cell of any chemistry having a size or total volume that is less than 0.5 cc.

As described in this detailed description, a helical groove is defined as a three-dimensional narrow channel or depression that turns around a longitudinal axis of a rod-shaped current collector at a constant distance while moving parallel to the axis.

Figure 1:
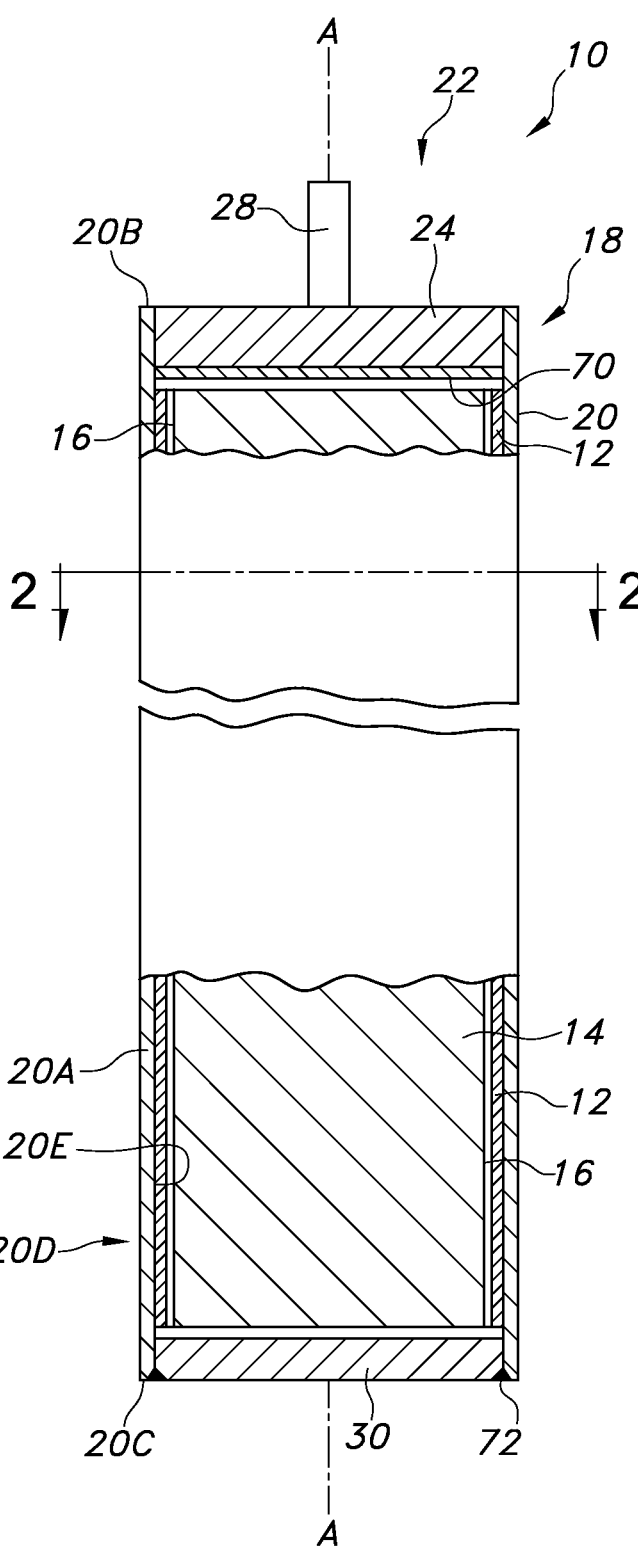
FIG. 1 is an elevational view, partly in cross-section, of an electrochemical cell 10 according to the present invention.
Figure 1A:
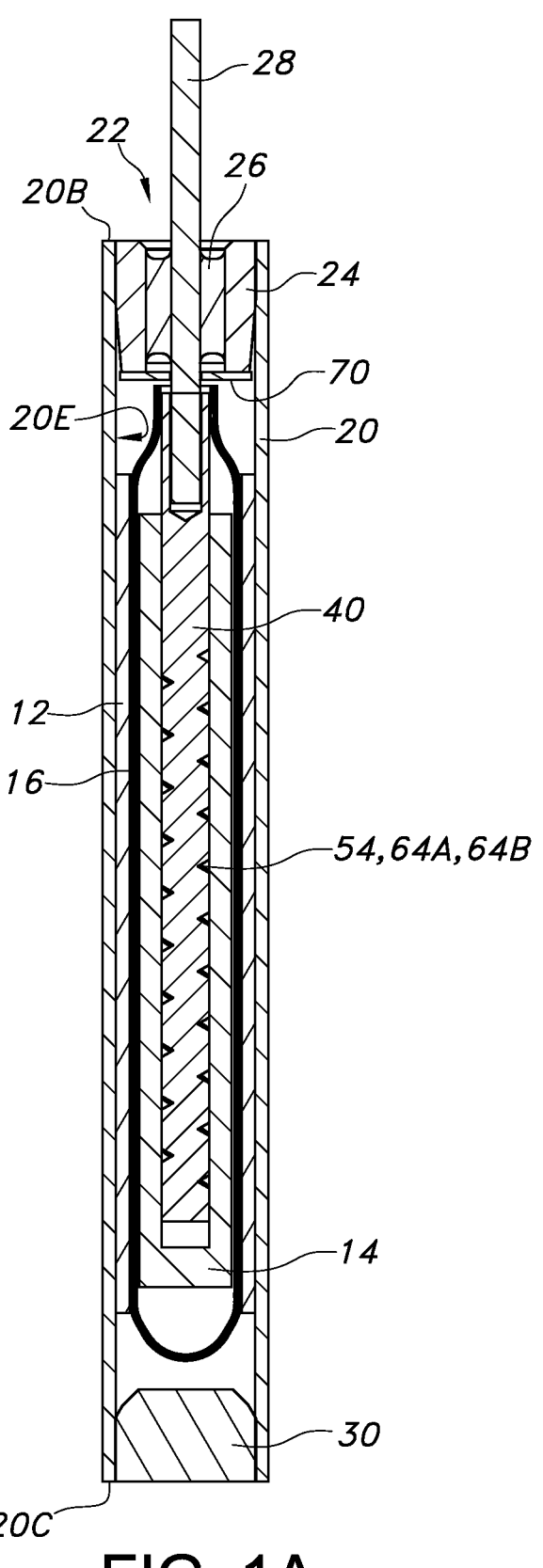
FIG. 1A is a cross-sectional view of the electrochemical cell 10 shown in FIG. 1.
Figure 2:
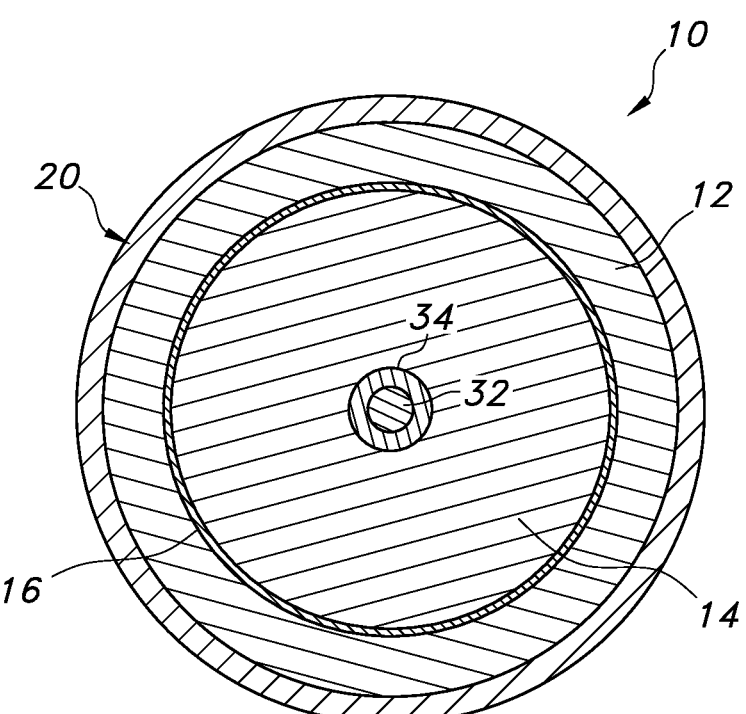
FIG. 2 is a cross-sectional view taken along line 2-2 of FIG. 1.

Referring now to the drawings, FIG. 1 is a partial cross-sectional view of an electrochemical cell 10 according to the present invention and FIG. 1A is a cross-sectional view of the cell 10 shown in FIG. 1. The cell 10 comprises an electrode assembly comprising an anode in the form of a sheet of lithium 12 that has been swaged onto the inner surface of a casing tube and segregated from a cathode 14 by an intermediate separator 16 (FIG. 2). Thus, the electrode assembly is housed inside a cylindrically-shaped casing 18 made of metal, such as stainless steel, titanium, nickel, aluminum, titanium being preferred, or other suitable electrically conductive materials. The casing 18 comprises a cylindrical tube 20 having a cylindrically-shaped sidewall 20A extending along a longitudinal axis A-A from a proximal open end defined by a proximal circular edge or annular rim 20B to a distal open end defined by a distal circular edge or distal annular rim 20C. The casing tube 20 also has a thickness defined by the distance between an outer cylindrical surface 20D and an inner cylindrical surface 20E.

As shown in FIG. 1A, a glass-to-metal seal 22 closing the proximal open end of the casing tube 20 comprises a ferrule 24 supporting an insulator glass 26 that seals between an inner surface of the ferrule and a terminal pin 28. The ferrule 24 is welded to the proximal annular rim 20B to close the proximal open end of the casing tube 20. The insulator glass 26 is of a corrosion resistant type having up to about 50% by weight silicon such as CABAL 12, TA 23, FUSITE 425 or FUSITE 435. The terminal pin 28 is of molybdenum, aluminum, nickel alloy, or stainless steel, the former being preferred. This structure is commonly referred to as a glass-to-metal seal (GTMS). The casing tube 20 is closed at its distal open end by a lower closure plate 30.

Preferably, the electrochemical cell 10 is built in a case-negative design with the casing tube 20 serving as the negative terminal. However, the cell 10 can also be built in a case-positive design with the electrode 14 shown in FIGS. 1, 1A and 2 being the anode and the other electrode 12 being the cathode. Both the case-negative and case-positive electrode designs are well known by those skilled in the art.

Figure 3:
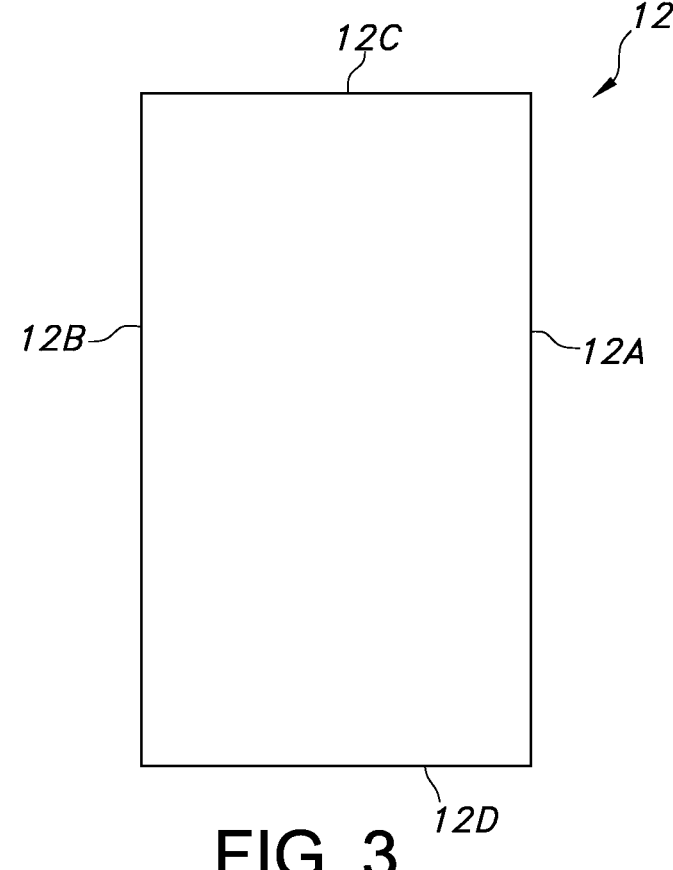
FIG. 3 is a plan view of a sheet of lithium 12 before it is swaged onto the inner surface of a casing tube 20 for the electrochemical cell 10.

Referring now to FIG. 3, the anode 12 comprises a cylindrically-shaped layer of lithium that is in direct physical contact with the inner cylindrical surface 20E of the casing tube 20. This assembly is formed by first providing a rectangular sheet of lithium 12 comprising spaced apart upper and lower edges 12A and 12B that extend to opposed right and left edges 12C and 12D.

Figures 4, 4A, 5, 6:
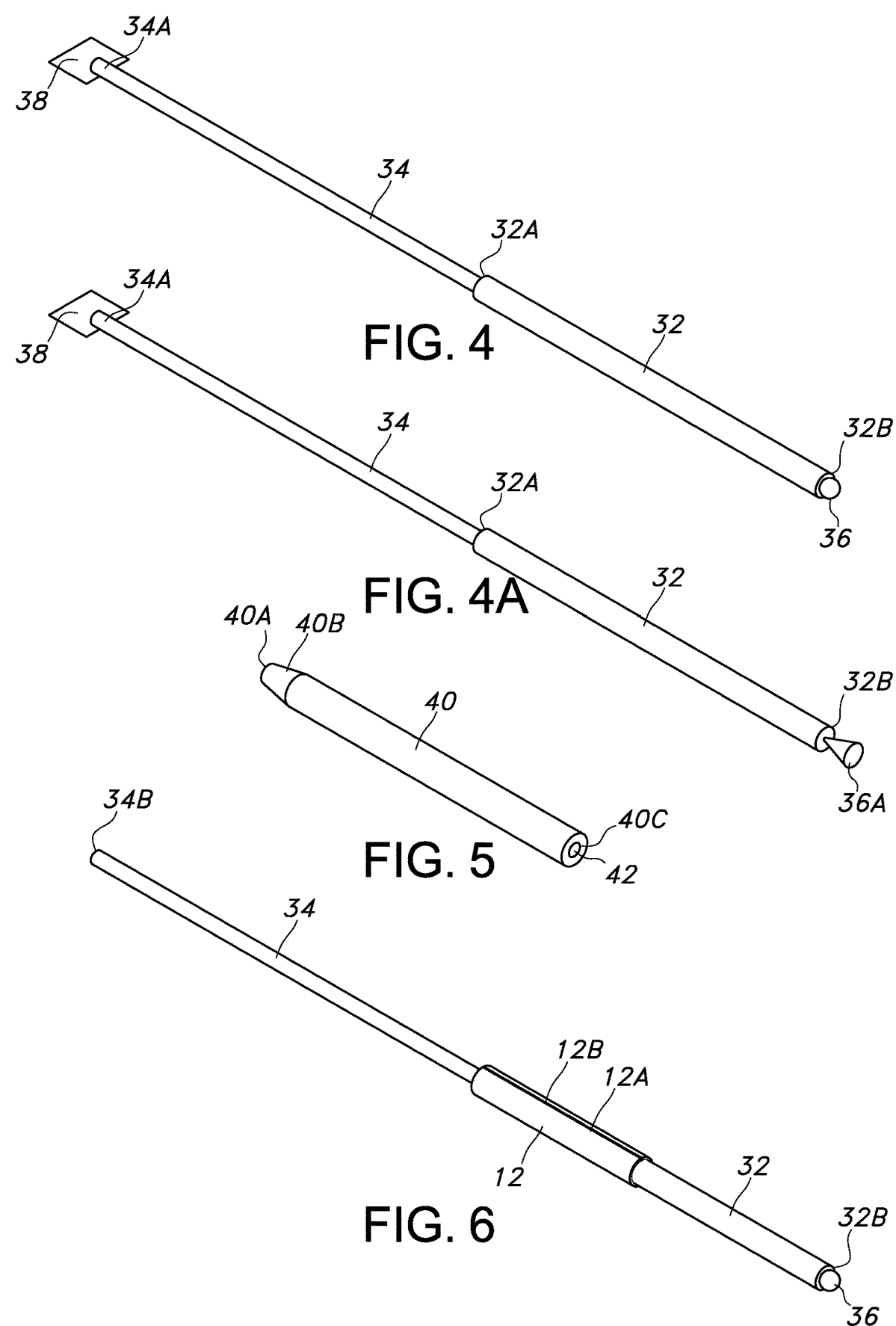
FIG. 4 is a perspective view of a shaft 34 connected to a distal ball 36 with the shaft supporting a radially-compliant polymeric tube 32.
FIG. 4A is a perspective view of the shaft 34 shown in FIG. 4 connected to a distal cone 36A with the shaft supporting the radially-compliant polymeric tube 32.
FIG. 5 is a perspective view of an insertion aid tool 40.
FIG. 6 is a perspective view of the sheet of lithium 12 shown in FIG. 3 rolled onto the radially-compliant polymeric tube 32 shown in FIG. 4.

As shown in FIGS. 4 and 5, to provide the layer of lithium 12 in direct physical contact with the inner surface 20E of the casing tube 20, an expandable mandrel or sleeve 32 of a radially-compliant polymeric material and a rigid cylindrical shaft 34 are separately provided. High density polyethylene (HDPE) is a suitable material for the sleeve 32, however, any radially-compliant polymeric material that will not stick to lithium is contemplated by the scope of the present invention.

The expandable sleeve 32 extends from a proximal end 32A to a distal end 32B. The rigid shaft 34 extends from a proximal end 34A to a distal end 34B supporting a ball 36. FIG. 4A shows an alternate embodiment where the shaft 34 is connected to a distal cone 36A with the shaft supporting the radially-compliant polymeric tube 32. In an embodiment of an electrochemical cell according to the present invention having the distal open end of the casing tube formed by the distal annular rim 20C closed prior to the lithium being swaged onto the inner surface of the casing tube, the distal cone 36A permits the shaft 34 supporting the radially-compliant polymeric tube 32 to extend deeper into the casing tube than the ball 36 permits.

If desired, a removable knob 38 is attached to the proximal end 34A of the shaft 34. The shaft 34 has an outer diameter that is less than an outer diameter of the ball 36. Prior to attaching the knob 38 to the proximal end 34A of the shaft 34, the expandable sleeve 32 is moved onto the shaft until it abuts the ball 36. The expandable sleeve 32 has an inner diameter that is slightly greater than the outer diameter of the shaft 34 but less than the outer diameter of the ball 36. With the sleeve 32 butted up against the ball 36, the ball prevents the sleeve 32 from sliding off the distal end 34B of the shaft 34.

The rectangular sheet of lithium 12 is then wrapped around the expandable sleeve 32 so that the opposed edges 12A and 12B of the sheet are butted against each other or at least very close to each other. If desired, the opposed edges 12A, 12B could also overlap a small distance. As shown in the drawings, the distal end 32B of the expandable sleeve 32 is left uncovered by the wrapped lithium sheet 12.

An insertion aid tool 40 is also provided. The insertion aid tool 40 has a generally cylindrical shape extending from the proximal open end 40A of a tapered proximal portion 40B to a distal open end 40C. A lumen 42 extending through the insertion aid tool 40 has a constant inner diameter from the proximal open end 40C to the distal open end 40A.

Figures 7, 8, 9:
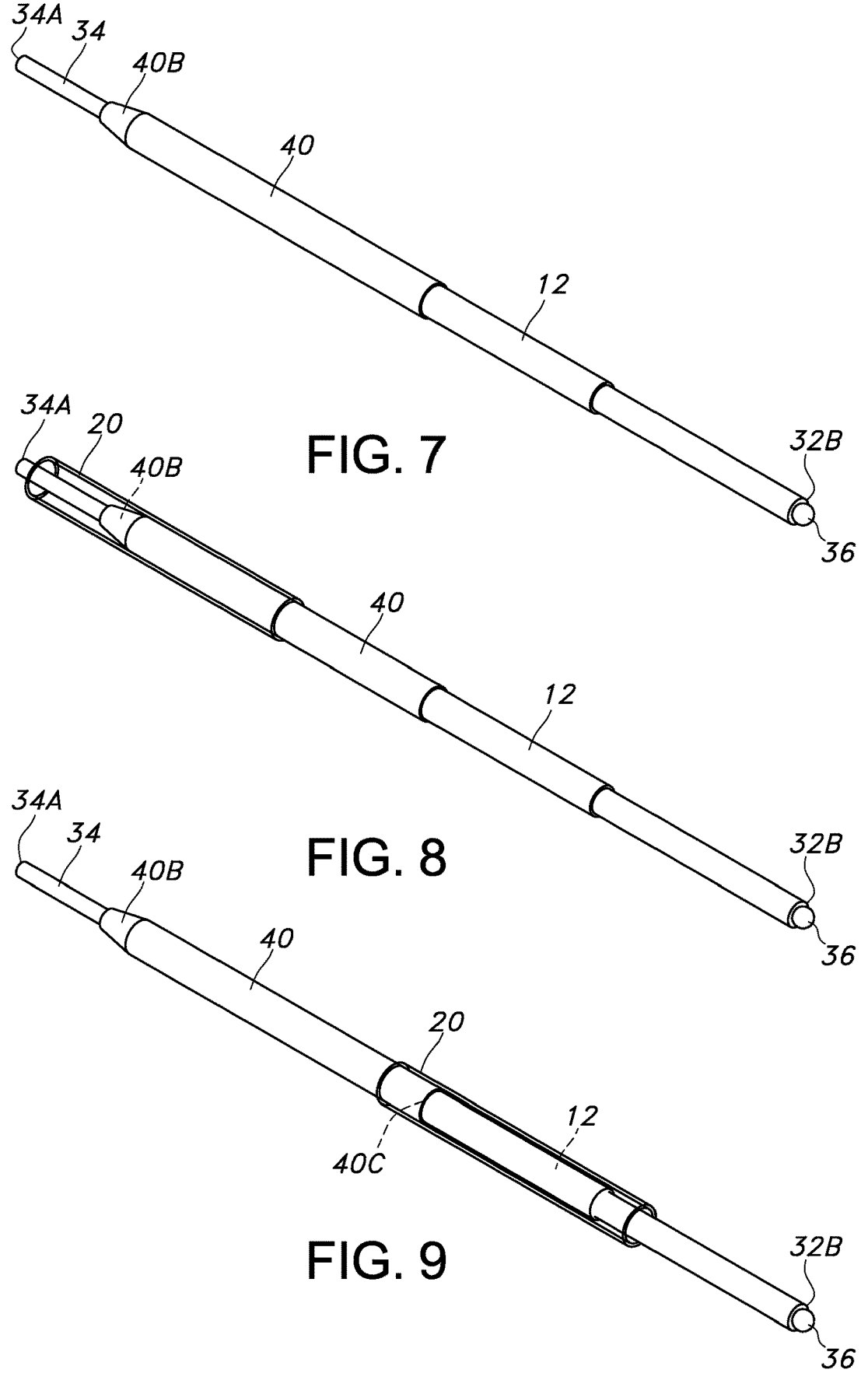
FIG. 7 is a perspective view of an anode swaging assembly according to the present invention comprising the insertion aid tool 40 shown in FIG. 5 having been moved onto the shaft 34 with the sheet of lithium 12 shown in FIG. 3 rolled onto the radially-compliant polymeric tube 32 shown in FIG. 4.
FIG. 8 is a perspective view of the anode swaging assembly shown in FIG. 7 being moved inside a casing tube 20.
FIG. 9 is a perspective view of the sheet of lithium 12 shown in FIGS. 7 and 8 centered inside the casing tube 20.
Figure 10:
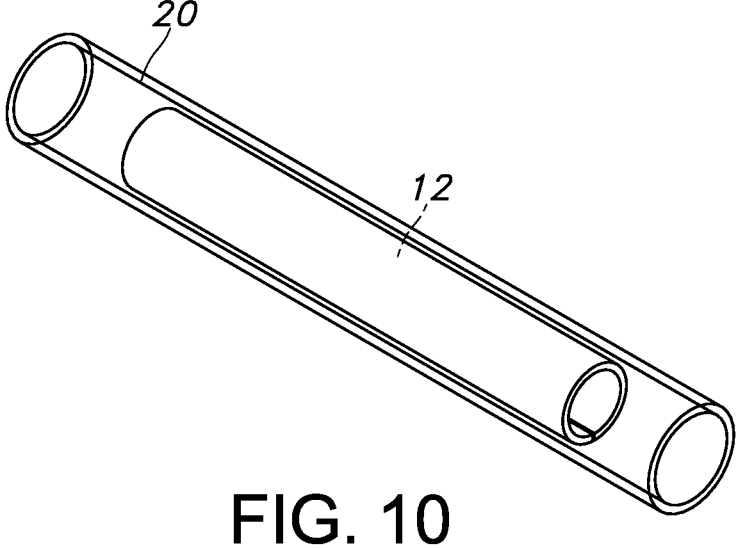
FIG. 10 is a perspective view showing the sheet of lithium 12 centered inside the casing tube 20.
Figure 11:
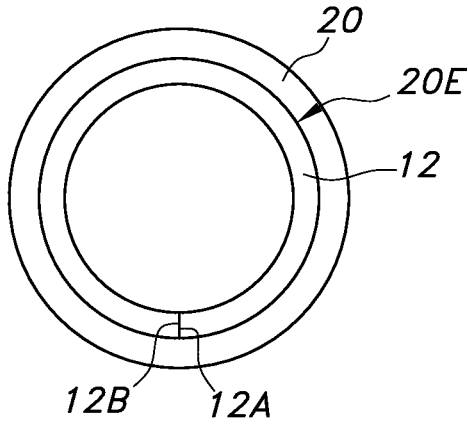
FIG. 11 is a cross-sectional view showing the sheet of lithium 12 after having been swaged onto the inner surface 20E of the casing tube 20.

As shown in FIG. 7, with the knob 38 removed from the shaft 34, the insertion aid tool 40 is moved onto the proximal end 34A of the shaft 34 and along the shaft until the distal open end 40C of the tool abuts the proximal end 32A of the expandable sleeve 32. In this position, the expandable sleeve 32 is prevented from moving in a proximal direction by the insertion aid tool 40, and the tapered proximal portion 40B of the tool faces the proximal end 34A of the shaft 34. The knob 38 is then attached to the proximal end 34A of the shaft 34 with a proximal portion of the shaft 34 adjacent to the knob 38 being left uncovered by the insertion aid tool 40. This is the portion of the shaft 34 that is held by a user with the knob 38 helping to prevent the shaft 34 from slipping out of the user's hand during use.

As shown in FIGS. 8 and 9, the shaft 34 with the ball 36/expandable sleeve 32 supporting the rolled lithium sheet 12/insertion aid tool 40 assembly is then moved into one of the open ends of the casing tube 20 until the rolled sheet of lithium 12 is centered inside the casing tube. Preferably, the casing tube 20 has a length measure from the proximal annular rim 20B to the distal annular rim 20C that is longer than that of the rolled lithium sheet 12 measured between the opposed upper and lower edges 12C, 12D of the sheet. In this position, the ball 36 and the distal end 32B of the expandable sleeve 32 supported on the distal portion of the shaft 34 extend outwardly from one of the open ends of the casing tube 20, for example, the distal annular rim 20C forming the distal open end of the casing tube.

With the rolled lithium sheet 12 centered inside the casing tube 20 and with the proximal end 40A/tapered portion 40B of the insertion aid tool 40 being gripped in one hand, a user grasps ahold of the proximal end 34A of the shaft 34 with the other hand. While holding the insertion aid tool 40 steady, the user pulls the shaft 34 in a proximal, backwardly direction at a steady and constant speed. This causes the ball 36 to slide through the distal end 32B of the expandable sleeve 32 and then into the proximal sleeve portion, which is inside the rolled lithium sheet 12. Since the ball 36 has a greater diameter than the inside diameter of the sleeve 32, the radially-compliant polymeric sleeve 32 expands in an equal radial manner so that its inner diameter substantially equals the outer diameter of the ball 36. When the ball reaches the portion of the sleeve supporting the rolled lithium sheet 12, further proximal movement of the ball 36 through the expandable sleeve 32 causes the lithium sheet to expand and press against the inner cylindrical surface 20E of the casing tube 20. This proximal movement of the ball 36 continues until the ball has been moved proximally past the upper edge 12C of the rolled lithium sheet 12 and out through the proximal annular rim 20B of the casing tube 20. The entire width measured between the opposed right and left edges 12A, 12B and length measure between the spaced-apart upper and lower edges 12C, 12D of the rolled lithium sheet 12 is now pressed into direct contact with the inner surface 20E of the casing tube 20. Preferably, there is a relatively short length of the casing tube adjacent to both its proximal end distal annular rims 20B, 20C that is left uncontacted by the thusly formed lithium layer 12. The significance of these uncontacted casing tube portions will be described in greater detail hereinafter. Finally, the distal end 32B of the expandable sleeve 32 that was not previously supporting the rolled lithium sheet 12 is carefully pulled in a proximal direction, through the expanded lithium sheet and out through the open proximal annular rim 20B of the casing tube 20. This completes forming the anode 12 shown in FIGS. 1 and 2.

Figures 12, 13:
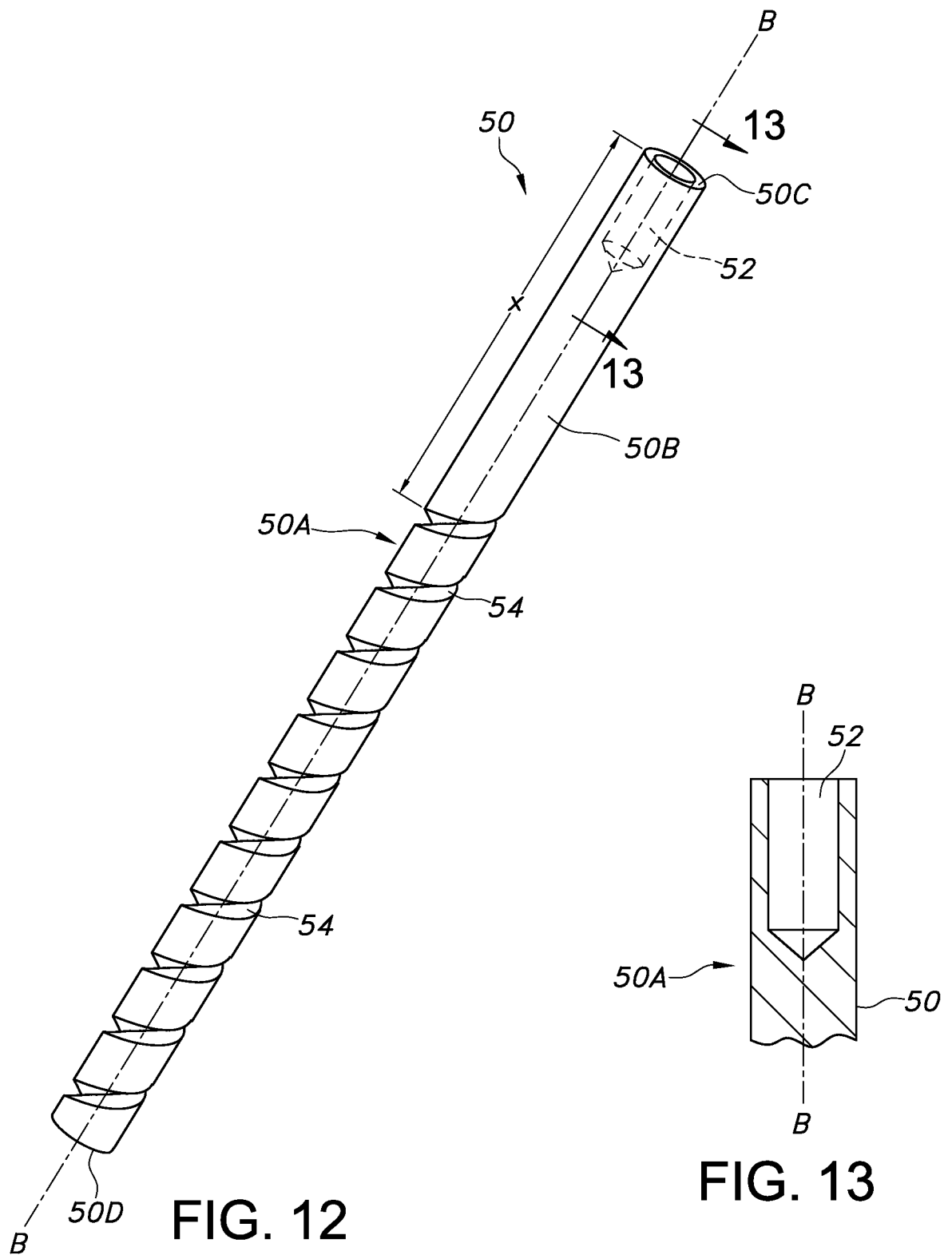
FIG. 12 is a perspective view of one embodiment of a cathode current collector 50 that is useful with the electrochemical cell 10 shown in FIGS. 1 and 1A.
FIG. 13 is a cross-sectional view, partly broken away, of a longitudinally aligned, co-axial counter bore 52 in the proximal portion 50B of the current collector 50 shown in FIG. 12.

FIGS. 12 and 13 illustrate one embodiment of a cathode current collector 50 according to the present invention. The current collector 50 is a rod-shaped member having an outer surface 50A in the shape of a cylinder aligned along a longitudinal axis B-B with an axial length extending from a proximal current collector portion 50B having a proximal end 50C to a distal current collector end 50D. A longitudinally aligned, co-axial counter bore 52 is provided in the proximal portion 50B such as by drilling, and the like. The bore 52 has a diameter and depth sufficient to receive the proximal end of the terminal pin 28 of the previously described glass-to-metal seal 22.

The proximal portion 50B of the current collector 50 has a relatively smooth outer surface. However, a helical groove 54 beginning at a distance "x" spaced distally from the proximal end 50C winds as a three-dimensional narrow channel or depression that turns around the longitudinal axis B-B of the rod-shaped member at a constant distance while moving parallel to the axis. The helical groove 54 extends substantially to the distal end 50D of the current collector. The depth of the helical groove 54 into the current collector 50 does not meet the longitudinal axis B-B. Moreover, the current collector 50 is devoid of any feature extending radially outwardly beyond the outer surface 50A.

Figures 14, 14A:
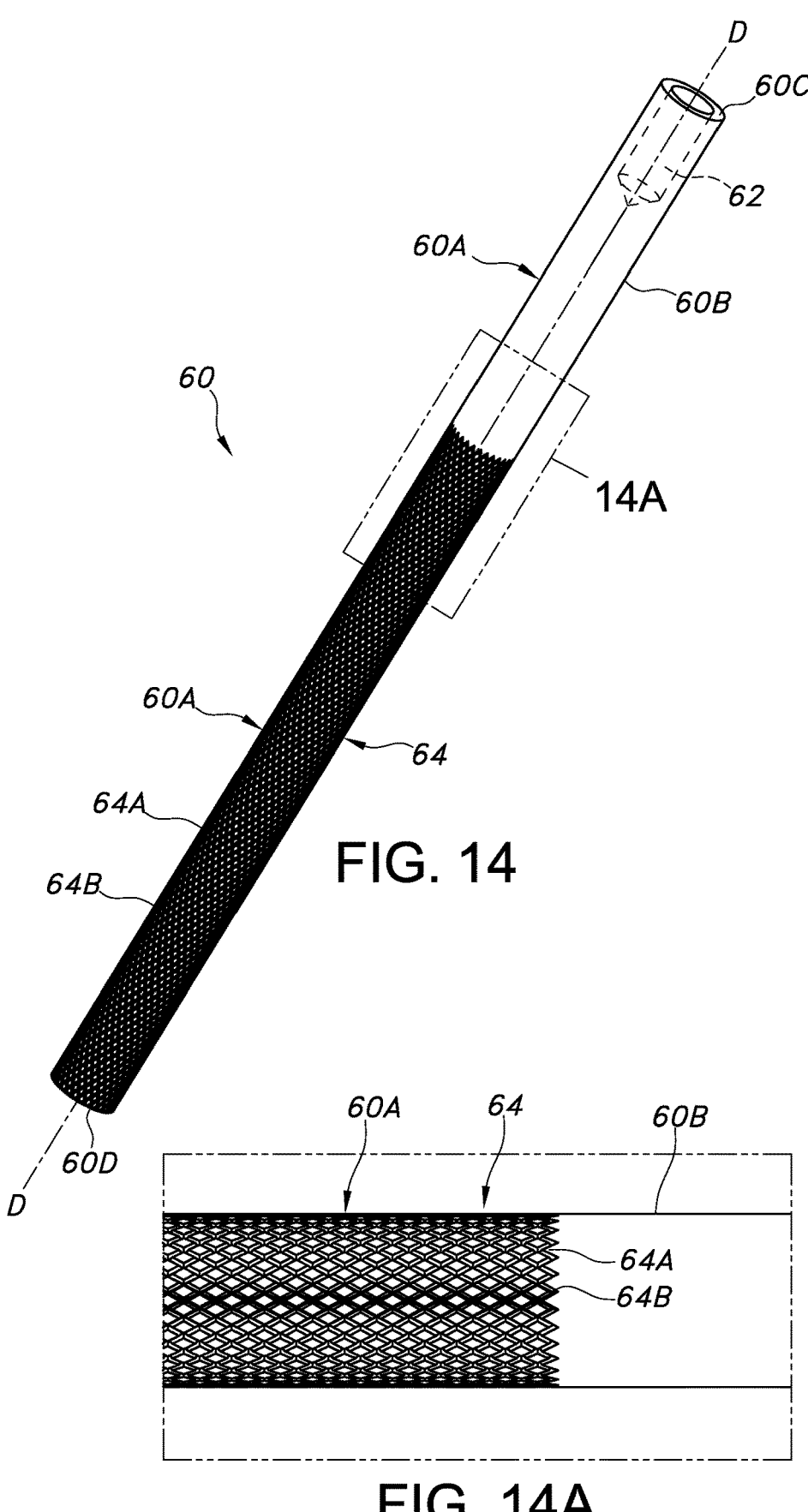
FIG. 14 is a perspective view, partly in phantom, of another embodiment of a cathode current collector 60 that is useful with the electrochemical cell 10 shown in FIGS. 1 and 1A.
FIG. 14A is an enlarged view of the indicated area shown in FIG. 14.
Figure 15:
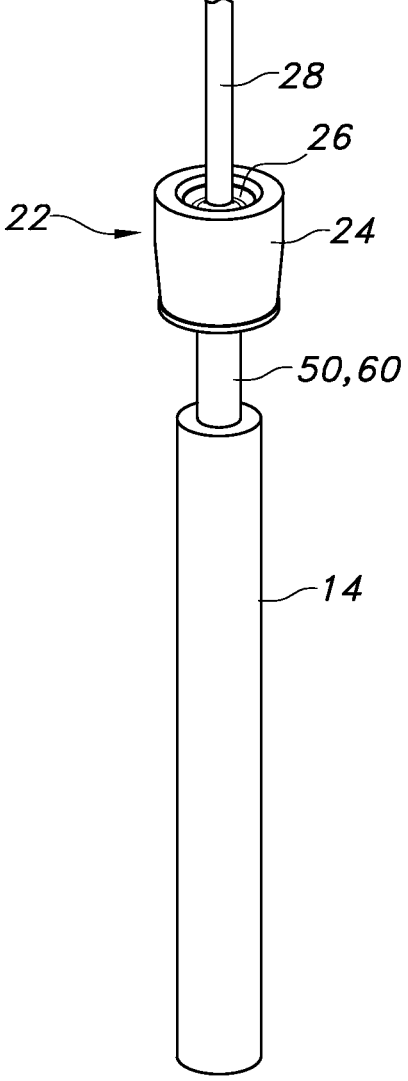
FIG. 15 is a perspective view showing the cathode 14 of the electrochemical cell 10 shown in FIGS. 1 and 1A supported on an exemplary current collector 50, 60 (FIGS. 12, 13, 14 and 14A) with the current collector connected to the terminal pin 28 of a glass-to-metal seal 22.

FIGS. 14 to 14A illustrate another embodiment of a cathode current collector 60 according to the present invention. The current collector 60 is a rod-shaped member having an outer surface 60A in the shape of a cylinder aligned axially along a longitudinal axis C-C with an axial length extending from a proximal current collector portion 60B having a proximal end 60C to a distal current collector end 60D. The proximal portion 60A of the current collector 60 has a relatively smooth outer surface. However, beginning distal the relatively smooth proximal portion 60B, a knurled surface 64 as a pattern of crisscrossing helical grooves 64A and 64B extends to the distal end thereof 60D. As viewed from a perspective looking straight down at the proximal end 60C of the current collector 60A, the crisscrossing pattern of helical grooves comprises a clock-wise extending helical groove 64A that winds as a three-dimensional narrow channel or depression turning around the longitudinal axis C-C of the rod-shaped member at a constant distance while moving parallel to the axis, and a counter-clockwise extending helical groove 64B that winds as a three-dimensional narrow channel or depression turning around the longitudinal axis C-C of the rod-shaped member at a constant distance moving parallel to the axis as it intersects the clock-wise extending helical groove 64A. The knurled surface 64 extends substantially to the distal end 60D of the current collector 60. The depth of the crisscrossing helical grooves 64A and 64B into the current collector 60 does not meet the longitudinal axis C-C. Moreover, the current collector 60 is devoid of any feature extending radially outwardly beyond the outer surface 60A.

The cathode 14 is then assembled by contacting a cathode active material, for example, fluorinated carbon CF$_x$, to one of the current collectors 50 and 60. The cathode active material 14 as a unitary body is supported in a surrounding and contact relationship with one of the previously described current collectors 50 and 60 so that the active material fills in and resides in the respective groove 54 and 64. That way, the cathode 14 has a substantially circular cross-section along the longitudinal axis of the current collector 50 and 60.

An important aspect of the present electrochemical cell 10 is that the grooves 54 and 64 serve as irregularly-shaped surfaces that prevent the cathode active material from losing contact with the respective current collector 50 and 60. That way, the cathode active material is incapable of sliding in an axial direction along the current collector 50 and 60, as well as separating and delaminating from the outer surface 50A and 60A thereof.

Suitable materials for the current collectors 50 and 60 include titanium, tantalum, platinum, gold, aluminum, cobalt nickel alloys, highly alloyed ferritic stainless steel containing molybdenum and chromium, and nickel-, chromium- and molybdenum-containing alloys, the former being preferred.

The cathode active material comprising the cathode 14 is preferably fluorinated carbon (CF$_x$). Other suitable cathode active materials include silver vanadium oxide (SVO), copper silver vanadium oxide, copper vanadium oxide, manganese dioxide, titanium disulfide, copper oxide, copper sulfide, iron sulfide, iron disulfide, lithium cobalt oxide, and mixtures thereof.

A polymeric insulator disc 70 is supported on the terminal pin 28, seated against the ferrule 24. In this position, the outer surrounding edge of the disc 70 meets the inner cylindrical surface 20E of the casing tube 20. The insulator disc 70 is of a fluoro-polymer, such as ethylene tetrafluoroethylene (ETFE), and helps prevent attack of the insulator glass 26 by the electrolyte. The terminal pin 28 is then slip-fit into the co-axial counter bore 52, 62 in the proximal portion 50B, 60B of the exemplary current collector 50, 60 and resistance welded thereto to connect the GTMS 22 to the cathode 14. The portion of the exemplary current collector 50 and 60 and terminal pin 28 between the upper surface of the cathode 14 and the insulator disc 70 remains uncovered.

Next, the cathode 14 is enveloped in an ionically porous polymeric material serving as the previously described separator 16 (FIG. 2). The proximal current collector portion 508 and 60B protrudes outwardly from the separator 16 for connection to the terminal pin 28. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The height of the anode 16 along the axial length of the casing tube 20 is somewhat longer than the height of the cathode 14 along the longitudinal axis of the respective rod-shaped current collector 50 and 60. The greater height of the anode 16 in comparison to the cathode 14 accommodates for some misalignment between the electrodes while maintaining anode material always opposite the cathode active material.

As previously described, the terminal pin 28 is supported in the GTMS 22 by the insulator glass 26. The ferrule 24 of the glass-to-metal seal 22 is welded, such as by laser welding, to the proximal open end of the casing tube 20 to hermetically close the proximal open end of the casing tube. The terminal pin 28 contacting the cathode active material 14 by the exemplary current collector 50 and 60 and electrically isolated from the GTMS 22 and casing 18 by the insulator glass 26 serves as the positive terminal for the electrochemical cell 10.

An electrolyte (not shown) is then filled into the casing tube 20 through the lower open end 20C thereof to activate the electrode assembly before the lower closure plate 30 is hermetically secured in the casing tube by a laser weld 72 (FIG. 1A). Preferably, the lower plate 30 is of the same material as the casing tube 20.

By way of example, in an illustrative primary cell, the lithium 12 anode active material contacted to the inner surface 20E of the casing tube 20 serves as the negative terminal for the electrochemical cell 10. The preferred cathode active material is CF$_x$ contacted to one of the exemplary rod-shaped cathode current collectors 50 and 80. This electrochemical couple is preferably activated with an exemplary electrolyte comprising a 1.0M to 1.4M solution of LiAsF$_6$ or LiPF$_6$ in γ-butyrolactone. A lithium/silver vanadium oxide (Li/SVO) couple is typically activated with an electrolyte comprising 1.0M to 1.4M of LiAsFe or LiPF$_6$ in a 50:50 mixture of, by volume, 1,2-dimethoxyethene and propylene carbonate.

It is appreciated that various modifications to the inventive concepts described herein may be apparent to those of ordinary skill in the art without departing from the scope of the present invention as defined by the appended claims.

What is claimed is:

1. A method for providing an electrochemical cell, comprising the steps of:
  a) providing a casing tube extending to an upper annular edge surrounding an upper open end spaced from a lower annular edge surrounding a lower open end, the casing tube having an outer surface spaced from an inner annular surface;
  b) providing an anode swaging assembly, comprising:
    i) a cylindrical shaft having a first diameter extending from a proximal shaft end to a distal shaft end, wherein a ball of a second diameter is supported at the distal shaft end, and wherein the second diameter of the ball is greater than the first diameter of the shaft;
    ii) a radially-compliant tube extending from a compliant tube proximal open end to a compliant tube distal open end, wherein the radially-compliant tube defines a compliant tube lumen having a third diameter that is greater than the first diameter of the shaft but less than the second diameter of the ball; and iii) an insertion aid tool comprising a cylindrical sidewall extending from an insertion aid tool proximal open end to an insertion aid tool distal open end, wherein the insertion aid tool defines an insertion aid tool lumen having a fourth inner diameter that is greater than the first diameter of the shaft but less than the second diameter of the ball, iv) wherein the radially-compliant tube is slidingly supported on the shaft with the compliant tube distal end butted up against the ball, and wherein the insertion aid tool is slidingly supported on the shaft with the insertion aid tool distal end butted up against the radially-compliant tube proximal end;

c) providing a sheet of lithium having a length extending from an upper edge to a lower edge, wherein the upper and lower edges extend to spaced apart right and left edges of the lithium sheet;

d) wrapping the sheet of lithium around the radially-compliant tube with the lower edge spaced closer to the ball than the upper edge and with the right and left edges adjacent to each other;

e) moving the anode swaging assembly having the lithium sheet wrapped around the radially-complaint tube inside the casing tube so that the lithium sheet is substantially centered in the casing tube;

f) moving the shaft in a proximal direction while the insertion aid tool remains stationary with the ball moving proximally into the distal open end of the radially-compliant tube to expand the compliant tube to a diameter that substantially matches the second diameter of the ball to thereby swage the lithium sheet onto the inner surface of the casing tube, wherein the swaged lithium provides an anode lumen;

g) continuing to move the shaft in a proximal direction while the insertion aid tool remains stationary until the ball reaches the proximal open end of the radially-compliant tube and then removing the anode swaging assembly from the casing tube, leaving the lithium sheet swaged onto the inner surface of the casing tube;

h) providing a cylindrically-shaped cathode comprising a cathode active material contacted to a rod-shaped current collector, wherein the cathode active material extends axially along the current collector from a proximal cathode active material end to a distal cathode active material end with a proximal portion of the current collector extending outwardly beyond the proximal cathode active material end;

i) providing a glass-to-metal seal (GTMS) comprising an insulator glass contacting a terminal pin centered inside a ferrule and connecting the terminal pin of the GTMS to the proximal portion of the rod-shaped current collector;

j) enveloping the cathode in a separator envelope to thereby provide a cathode assembly;

k) positioning the cathode assembly in the anode lumen and securing the ferrule of the GTMS to the upper open end of the casing tube;

l) Filling an electrolyte into the casing tube through the lower open end; and m) securing a lower closure plate to the lower open end of the casing tube to provide the electrochemical cell, wherein the casing tube comprises the negative terminal and the terminal pin comprises the positive terminal.

2. The method of claim 1, including swaging the lithium sheet onto the inner surface of the casing tube with the right and left edges of the lithium sheet meeting each other.

3. The method of claim 1, including swaging the lithium sheet onto the inner surface of the casing tube with the right and left edges of the lithium sheet being spaced apart from each other by a gap.

4. The method of claim 1, wherein other than the casing tube, the lithium sheet does not contact a current collector.

5. The method of claim 1, including providing at least one helical groove recessed into an outer surface of the rod-shaped current collector.

6. The method of claim 5, including providing two crisscrossing helical grooves recessed into the outer surface of the current collector that turn around the longitudinal axis in opposed clockwise and counterclockwise directions at a constant distance while moving parallel to the axis.

7. The method of claim 1, including providing the rod-shaped cathode current collector comprising a longitudinally aligned, co-axial counter bore, and wherein a proximal end of the terminal pin is received in the counter bore.

8. The method of claim 1, including providing fluorinated carbon ($CF_x$) as the cathode active material.

9. The method of claim 1, including providing the electrochemical cell having a total volume that is less than 0.5 cc.

10. The method of claim 1, including providing the upper edge of the swaged lithium sheet being spaced distally from the proximal open end of the casing tube and the lower edge of the swaged lithium sheet being spaced proximally from the distal open end of the casing tube.

11. A method for providing an anode, comprising the steps of:

a) providing a casing tube extending to an upper annular edge surrounding an upper open end spaced from a lower annular edge surrounding a lower open end, the casing tube having an outer surface spaced from an inner annular surface;

b) providing an anode swaging assembly, comprising:

i) a cylindrical shaft having a first diameter extending from a proximal shaft end to a distal shaft end, wherein a ball of a second diameter is supported at the distal shaft end, and wherein the second diameter of the ball is greater than the first diameter of the shaft;

ii) a radially-compliant tube extending from a compliant tube proximal open end to a compliant tube distal open end, wherein the radially-compliant tube defines a compliant tube lumen having a third diameter that is greater than the first diameter of the shaft but less than the second diameter of the ball; and iii) an insertion aid tool comprising a cylindrical sidewall extending from an insertion aid tool proximal open end to an insertion aid tool distal open end, wherein the insertion aid tool defines an insertion aid tool lumen having a fourth inner diameter that is greater than the first diameter of the shaft but less than the second diameter of the ball, iv) wherein the radially-compliant tube is slidingly supported on the shaft with the compliant tube distal end butted up against the ball, and wherein the insertion aid tool is slidingly supported on the shaft with the insertion aid tool distal end butted up against the radially-compliant tube proximal end;

c) providing a sheet of lithium having a length extending from an upper edge to a lower edge, wherein the upper and lower edges extend to spaced apart right and left edges of the lithium sheet;

d) wrapping the sheet of lithium around the radially-compliant tube with the lower edge spaced closer to the ball than the upper edge and with the right and left edges adjacent to each other;

e) moving the anode swaging assembly having the lithium sheet wrapped around the radially-complaint tube inside the casing tube so that the lithium sheet is substantially centered in the casing tube;

f) moving the shaft in a proximal direction while the insertion aid tool remains stationary with the ball moving proximally into the distal open end of the radially-compliant tube to expand the compliant tube to a diameter that substantially matches the second diameter of the ball to thereby swage the lithium sheet onto the inner surface of the casing tube, wherein the swaged lithium provides an anode lumen; and g) continuing to move the shaft in a proximal direction while the insertion aid tool remains stationary until the ball reaches the proximal open end of the radially-compliant tube and then removing the anode swaging assembly from the casing tube, leaving the lithium sheet swaged onto the inner surface of the casing tube.

12. The method of claim 11, including swaging the lithium sheet onto the inner surface of the casing tube with the right and left edges of the lithium sheet meeting each other.

13. The method of claim 11, including swaging the lithium sheet onto the inner surface of the casing tube with the right and left edges of the lithium sheet being spaced apart from each other by a gap.

14. The method of claim 11, wherein other than the casing tube, the lithium sheet does not contact a current collector.

* * * * *